Sept. 22, 1970 | KIYOHARU MIYAWAKI | 3,530,251
VIDEO TELEPHONE SET
Filed Nov. 21, 1967
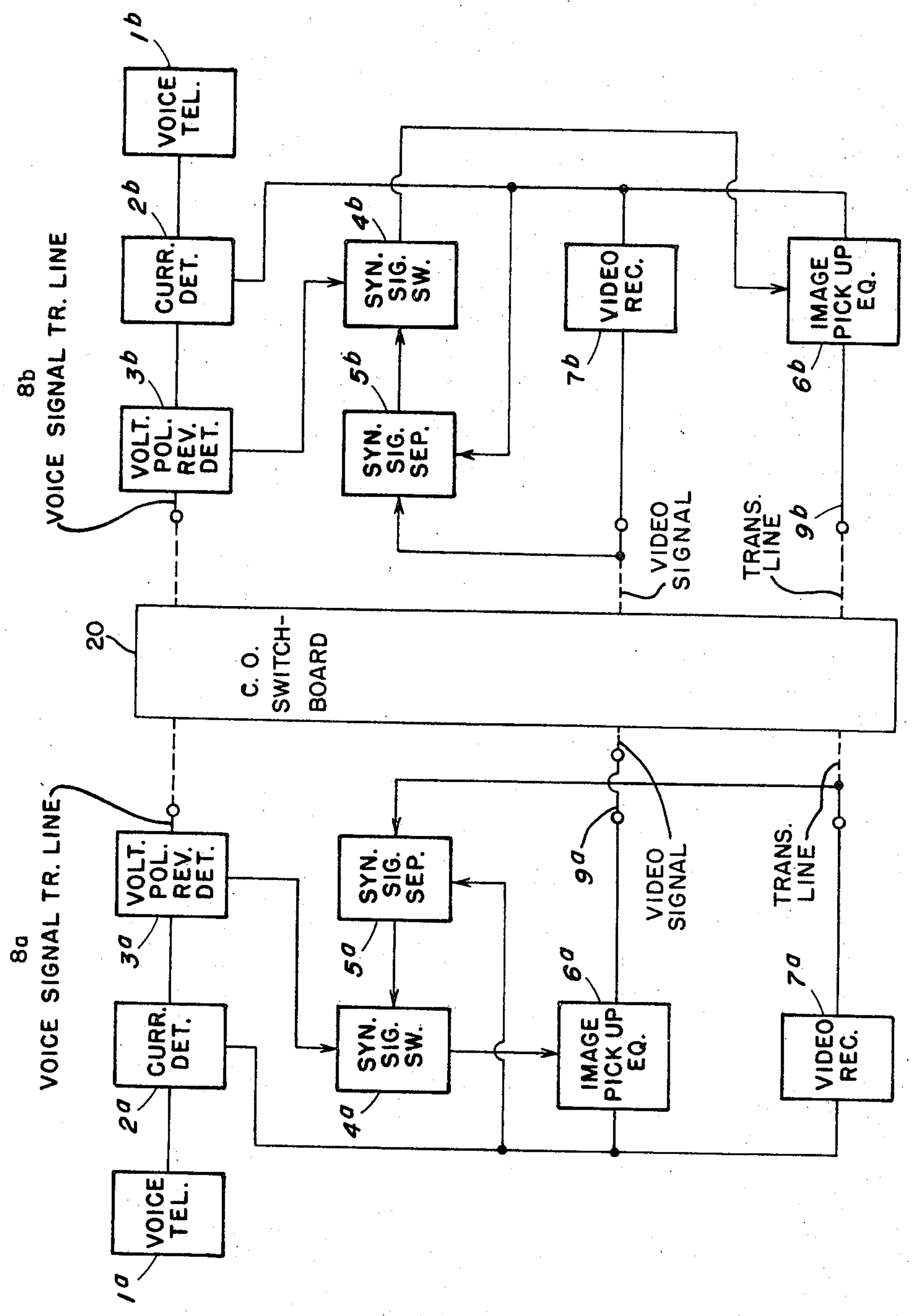
INVENTOR.
KIYOHARU MIYAWAKI
BY
Mann & Jangarathis
ATTORNEYS United States Patent Office 3,530,251

Patented Sept. 22, 1970

3,530,251

VIDEO TELEPHONE SET

Kiyoharu Miyawaki, Tokyo, Japan, assignor to Nippon Electric Company, Limited, Tokyo, Japan Filed Nov. 21, 1967, Ser. No. 684,799
Claims priority, application Japan, Nov. 21, 1966, 41/76,173
Int. Cl. H04m 11/00
U.S. Cl. 179—2 5 Claims

ABSTRACT OF THE DISCLOSURE

A video telephone set system, including two geographically spaced telephone sets equipped with image pick-up equipments producing appropriate direct current and alternating current signals of preselected frequencies for utilizing the alternating current signals to synchronize the image pick-up equipment of each telephone set with the image pick-up equipment of the other telephone set.

This invention relates to a video telephone system, and more specifically to such system embodying two geographically spaced video telephone sets equipped with two image pick-up equipments for producing two alternating currents of appropriate frequencies utilized to maintain synchronism between such two image pick-up equipments.

Heretofore, it was found that when visual images of image information produced at and transmitted between originating and terminating video telephone sets were received at the respective sets, the synchronization between the sets was impaired due to discordance (asynchronism) occurring between the synchronizing signals produced at the originating and terminating image pick-up equipments, both image pick-up equipments having respectively independent signal sources. Also, it was heretofore found that the reception of visual images from image information picked up independently at the originating and terminating telephone sets included noise leakage signals and the like. Such noise introduced into the image signals during blanking intervals was frequently visible in the picture image. As a consequence of the effects of such asynchronous synchronizing signals, noise and the like, the quality of the received pictures was not only lowered, but in addition the view was greatly obstructed.

The present invention contemplates an arrangement for providing coincident (synchronous) synchronizing signals between image pick-up equipments of originating and terminating telephone sets embodied in a video telephone set system.

It is a principal object of the invention to maintain synchronization between originating and terminating telephone sets in a video telephone set system.

It is another object to minimize the impairment of synchronization between originating and terminating telephone sets in a video telephone set system.

It is a further object to improve the quality of picture reception in a video telephone set system.

An additional object is to reduce the introduction of extraneous noise and the like into a video telephone set system.

Still another object is to include the production of synchronizing signals together with the video signals produced at originating and terminating telephone sets in a video telephone set system and to transmit such synchronizing signals between the telephone sets for maintaining synchronization therebetween.

In association with two geographically spaced video telephone sets identified hereinafter as calling or originating and called or terminating sets and interconnected via a switchboard, each including an image pick-up equipment and a video receiver, a specific embodiment of the present invention comprises the calling set applying direct current to flow in one direction in a first closed loop in a voice signal transmission line upon the initiation of an outgoing call therefrom and the called set applying a direct current to flow in one direction in a second closed loop in the voice signal line upon the answering of the call incoming thereto, and each telephone set additionally including a direct current detector and a reversed polarity voltage detector connected to the voice signal line, a synchronizing signal separator connected to a signal transmission line transmitting an incoming synchronizing signal together with the incoming picture signals, a synchronizing signal changeover switch interconnecting the image pick-up equipment, the reversed polarity voltage detector and the synchronizing signal separator, and a signal transmission line transmitting an outgoing synchronizing signal together with the outgoing picture signals.

The operation of the specific embodiment of the invention takes place in the following manner. Upon the initiation of an outgoing telephone call at the calling telephone set by picking up the transmitter-receiver from its cradle to create an off-hook condition, the calling set applies a direct current to the first closed voice loop to flow therein in the one direction. This current detected by the direct current detector in the first closed loop provides a first control voltage which drives the calling video receiver, activates the calling image pick-up equipment to transmit an outgoing synchronizing alternating current signal of a first preselected frequency together with the outgoing picture signals on an outgoing picture signal transmission line to the called set, and conditions the calling synchronizing signal separator to separate an incoming synchronizing alternating current signal of a second preselected frequency from the picture signals incoming on an incoming picture signal transmission line to the calling set from the called set.

When the called telephone set answers the telephone call incoming thereto from the calling telephone set by lifting the transmitter-receiver from its cradle to create an off-hook condition, the called set applies a direct current to the second closed loop to flow therein in the one direction. In response to the current flowing in the one direction in the second closed loop at the called telephone set, the one direction current applied to the first closed loop at the calling set is reversed in the direction of flow in a known manner. The direct current flowing in the one direction in the second closed loop at the called telephone set and detected by the direct current detector connected to the latter loop provides a second control voltage which drives the called video receiver, activates the called image pick-up epuipment to transmit the outgoing second synchronizing signal together with the outgoing picture signals on the outgoing signal line from the called set, and conditions the called signal separator to separate the first synchronizing signal from the picture signals incoming to the called set on the incoming signal line from the calling set.

Again returning to the calling set, the reversed direction current flowing in the first closed loop at the calling set is detected by the reverse polarity voltage detector thereat to provide a third control voltage which activates the calling synchronizing signal changeover switch to pass therethrough the second synchronizing signal from the calling synchronizing signal separator to the calling image pick-up equipment. This second synchronizing signal serves to synchronize the image pick-up equipment of the calling set with the image pick-up equipment of the called set and to terminate the transmission of the first synchronizing signal from the calling image pick-up equipment. The switchboard can be adjusted to interchange the connections thereat to enable the initial calling and called telephone sets to function in a reverse sense, i.e., the switchboard connections can be interchanged to enable the above-mentioned calling telephone set to operate as the called telephone set and the above-noted called telephone set to operate as the calling telephone set.

The invention is readily understood from the following description taken together with the accompanying drawing which shows a box diagram of a video telephone set system including a specific embodiment of the invention.

The drawing illustrates two geographically spaced voice telephone sets 1*a* and 1*b* interconnected by voice signal transmission lines 8*a* and 8*b* which are respectively connected with, for example, a switchboard put between them and including image pick-up equipments 6*a* and 6*b*, and video receivers 7*a* and 7*b* interconnected by picture signal transmission lines 9*a* and 9*b*, respectively. A video telephone set as refrred to herein is understood in the art to comprise image pick-up equipment for converting image information which appears at local vision, that is, the face of a user of the local telephone set, an article or a document positioned thereat, into electrical signals for transmission to a distant video telephone set, and a picture receiver for reproducing the image information provided at and incoming from the distant video telephone set. For the purpose of this description, telephone sets 1*a* and 1*b* are hereinafter referred to as calling and called telephone sets, respectively.

In association with the aforementioned video telephone set apparatus, a specific embodiment of the present invention comprises direct current detectors 2*a* and 2*b*, reversed polarity voltage detectors 3*a* and 3*b*, synchronizing signal changeover switches 4*a* and 4*b* normally resting in an open-circuit state, and synchronizing signal separators 5*a* and 5*b* interconnecting the above-described video telephone set apparatus in a manner and for a purpose that are subsequently stated. As used herein, a synchronizing signal separator is a filter or an equivalent device which separates a synchronizing alternating current of a preselected frequency from the video signals including alternating current of varying frequencies. It is noted in the drawing that current detectors 2*a* and 2*b* and voltage detectors 3*a* and 3*b* are connected in voice signal transmission lines 8*a* and 8*b* while synchronizing signal separators 5*a* and 5*b*, image pick-up equipments 6*a* and 6*b*, and video receivers 7*a* and 7*b* are connected to the respective current detectors 2*a* and 2*b*. Thus, the synchronizing signal separators are conditioned to separate the incoming synchronizing signals from the incoming video signals in a manner that is later explained. Reversed polarity voltage detectors 3*a* and 3*b* control the operativeness of synchronizing signal changeover switches 4*a* and 4*b* to pass therethrough incoming synchronizing signals from synchronizing signal separators 5*a* and 5*b* to the associated image pick-up equipments 6*a* and 6*b* in a manner that is subsequently mentioned.

Thus, a synchronizing alternating current signal of a second preselected frequency incoming to calling image pick-up equipment 6*a* via a third signal transmission line 9*b* from called image pick-up equipment 6*b* serves to synchronize calling image pick-up equipment 6*a* with called image pick-up equipment 6*b* in a manner that is pointed out below. On the other hand, when telephone set 1*a* is called and telephone set 1*b* is calling, a synchronizing alternating current signal of a first preselected frequency different from the second preselected synchronizing signal frequency incoming to the calling image pick-up equipment 6*b* via a second signal transmission line 9*a* from called pick-up equipment 6*a* serves to synchronize calling image pick-up equipment 6*a* in a manner that is later described.

The operation of the specific embodiment of the invention is presently explained. Assuming, for example, calling telephone set 1*a* initiates an outgoing telephone call by picking up the transmitter-receiver from its cradle to create an off-hook condition, this set applies effectively a direct current to flow in one direction in first signal line 8*a* formed in a first closed loop for voice signal transmission in a way well known in the art to institute a flow of direct current in the latter loop. This current detected in current detector 2*a* provides a first control voltage to activate simultaneously synchronizing signal separator 5*a*, image pick-up equipment 6*a* and video receiver 7*a* thereby completing preparation for talking at the calling telephone set 1*a* and for an answer from called set 1*b*. At the same time, calling image pick-up equipment 6*a* is activated to transmit the first synchronizing signal together with the video signals produced therein on the second signal line 9*a* to the called set 1*b*.

When called telephone set 1*b* answers the call incoming thereto and initiated at calling telephone set 1*a* by picking up the transmitter-receiver from its cradle to create an off-hook condition voice line 8*b* forms a second closed loop in which direct current flows. In response to the flow of direct current in the second closed loop at called telephone set, the one direction current applied to voice line 8*a* by the calling set 1*a* is reversed in a known manner. The direct current flowing in the second closed-circuit loop in the voice line 8*b* and detected by current detector 2*b* provides a second control voltage which activates simultaneously called synchronizing signal separator 5*b*, called image pick-up equipment 6*b* and called video receiver 7*b* thereby completing the preparation for talking by the called party. At the same time, called image pick-up equipment 6*b* is energized to transmit the second synchronizing signal together with video signals produced therein on the third signal line 9*b* to the calling set 1*a*.

Referring now to calling telephone set 1*a* in the drawing, it is seen therein that the reversed direction current flowing in the first closed-circuit loop in voice signal line 8*a* at calling set 1*a* is detected in reversed direction current detector 3*a* to provide a third control voltage. This voltage activates synchronizing signal changeover switch 4*a* to a closed-circuit state to pass therethrough the second synchronizing signal from synchronizing signal separator 5*a* to image pick-up equipment 6*a*. It is recalled at this time from the previous explanation that synchronizing signal separator 5*a* was initially conditioned by the first control voltage to pass the second synchronizing signal therethrough to image pick-up equipment 6*a*. The second synchronizing signal received in the calling image pick-up equipment 6*a* at calling set 1*a* serves to synchronize the latter equipment with called image pick-up equipment 6*b* at called set 1*b* and at the same time to terminate the transmission of the first synchronizing signal from the calling image pick-up equipment 6*a* to outgoing picture signal line 9*a*.

Again, referring to called telephone set 1*b* in the drawing, it is seen therein that the direct current flows in the one direction in the second closed-circuit invoice signal line 8*b* at the called telephone set 1*b*. This permits the reversed direction current detector 3*b* to remain inactive whereby the called synchronizing signal changeover switch 4*b* is also permitted to remain inactivated to block the passage therethrough of the first synchronizing signal from synchronizing signal separator 5*b* to image pick-up equipment 6*b*. It is recalled from the previous explanation that while called synchronizing signal separator 5*b* as presently activated by the second control voltage to select the first synchronizing signal from the picture signals transmitted on incoming line 9*a* to called set 1*b*, such activation is not significant at this time for the reason that the application of the first synchronizing signal current to line 9*a* by the calling image pick-up equipment 6*a* at calling set 1*a* is now terminated as hereinbefore explained.

Thus, the synchronizing signal produced at the called telephone set for transmitting the second synchronizing signal to the calling set in the manner previously explained serves to maintain improved synchronization between the respective sets. Also, this synchronization serves to obviate the deleterious effects resulting from asynchronous synchronizing signals, noise, leakage signals and the like occurring in a video telephone set system whereby the quality or definition of the pictures produced at the video receivers of the respective video telephone sets is substantially improved.

Upon the completion of talking by either the calling or called telephone set by returning the transmitter-receiver to its cradle to create an on-hook condition, or both sets, at a given time, the flow of direct current in either voice signal transmission line 8*a* or 8*b*, or both, is terminated thereby cutting off the functioning of all talking facilities thereat. This cuts off the functioning of current detectors 2*a* and 2*b* and reverse polarity voltage detectors 3*a* and 3*b*, as well as that of the remaining apparatus connected to the shut down telephone sets.

When telephone sets 1*a* and 1*b* are contemplated for operation in a sense opposite to that as above explained, i.e., set 1*a* to function as the called set and set 1*b* to perform as the calling set, it is understood that switchboard 20 is adjusted to interchange the necessary circuit connections thereat in a manner familiar to that art to permit such operation. This means that the first synchronizing signal current is sent out from the called image pick-up equipment 6*a* on line 9*a* to the calling synchronizing signal separator 5*b* while at the same time the transmission of the second synchronizing signal current sent out by image pick-up device 6*b* on line 9*b* to the called synchronizing signal separator 6*a* is terminated. This fisrt synchronizing signal current serves to synchronize the calling image pick-up equipment 6*b* with the called image pick-up equipment 6*a* essentially in the manner hereinbefore explained for the first-mentioned operation involving set 1*a* as the calling set and set 1*b* as the called set.

For the convenience of the foregoing explanation of the drawing, the image pick-up equipment, the synchronizing signal separator and the synchronizing signal changeover switch were regarded as respectively separate components while as a matter of fact such components may be regarded as an image pick-up equipment of a single unit embodying the synchronizing signal separator and the synchronizing signal changeover switch therein.

It is understood that the invention herein is described in specific respects for the purpose of this description. It is also understood that such respects are merely illustrative of the application of the invention. Numerous other arrangements may be devised by those skilled in the art without departing from the spirit and scope of the invention.

What is claimed is:

1. A video telephone set system, comprising in combination:

three signal transmission lines interconnecting two geographically spaced points;

a first video telephone set station connected to corresponding one ends of said three lines at one of said points and including a first telephone set connected to said one end of a first of said three lines and normally resting in an on-hook condition to establish a first open-circuit loop in said first line at said one point, said set changed to an off-hook condition upon the initiation of an outgoing call therefrom to change said first open-circuit loop into a first closed-circuit loop having direct current flowing in one direction therein, means for detecting said one direction current flowing in said first closed-circuit loop to provide a first control voltage, means activated by said first control voltage to apply a first synchronizing signal current to said one end of a second of said three lines and conditioned by said last-mentioned voltage to select a second synchronizing signal current incoming on a third of said three lines, and means normally inactivated for blocking the transmission of said selected second synchronizing signal in said first synchronizing signal means;

and a second video telephone set station connected to corresponding other ends of said three lines at a second of said points and including a second telephone set connected to said other end of said first line and normally resting in an on-hook condition to establish a second open-circuit loop in said line at said second point, said last-mentioned set changed to an off-hook condition in answer to said call incoming thereto to change said second open-circuit loop into a second closed-circuit loop having direct current flowing in one direction therein, said last-mentioned current causing said one direction current in said first closed-circuit loop to flow therein in a direction reversed from said one direction, means for detecting said current flowing in said second closed-circuit loop to provide a second control voltage, and means activated by said second control voltage to apply said second synchronizing signal to said other end of said third line;

said first-mentioned detecting means detecting said reversed direction current in said first closed-circuit loop to continue to provide said first control voltage;

and means included in said first video telephone set station for detecting only the reversed direction current flowing in said first closed-circuit loop to provide a third control voltage which activates said blocking means to permit the transmission of said second synchronizing signal current in said first synchronizing signal means for synchronizing said last-mentioned means with said second synchronizing signal means at said second telephone set station and at the same time for terminating the application of said first synchronizing signal current to said one end of said second line by said first synchronizing signal means.

2. The video telephone set system according to claim 1 in which said first synchronizing signal means comprises means activated by said first control voltage to generate and apply said first synchronizing signal current to said one end of said second line;

and means activated by said first control voltage to select said second synchronizing signal current incoming on said third line;

said blocking means connected in circuit between said first synchronizing signal generating means and last-mentioned second signal selecting means.

3. The video telephone set system according to claim 2 in which said blocking means comprises an electric switch means normally resting in an open-circuit state to prevent the transmission of said selected second synchronizing signal current therethrough from said second synchronizing signal current selecting means to said first synchronizing signal generating means, said switch means activated by said third control voltage to a closed-circuit state to transmit therethrough said last-mentioned signal current from said last-mentioned selecting means to said last-mentioned generating means.

4. A video telephone set system comprising:

a first transmission line for voice signals;

second and third transmission lines for synchronizing and picture signals;

a calling telephone set connected to one end of said first line and normally resting in an on-hook condition to establish a first open-circuit loop at said first line one end, said set changed to an off-hook condition upon the initiation of an outgoing call to change said first open-circuit loop to a first closed-circuit loop having direct current flowing in one direction therein;

means connected to said first closed-circuit loop for detecting said one direction current to provide a first control voltage;

means activated by said first control voltage at said first line one end to apply a first synchronizing signal to one end of said second line corresponding to said one end of said first line;

filter means activated by said first control voltage at said first line one end to select a second synchronizing signal from one end of said third line;

means connected in circuit between said first signal means and filter means and normally deactivated to block the transmission of said selected second synchronizing signal from said filter means to said first signal means;

a called telephone set connected to a distant end of said first line and normally resting in an on-hook condition to establish a second open-circuit loop at said first line distant end, said last-mentioned set changed to an off-hook condition in answer to said first-mentioned call which is incoming thereto to change said second open-loop circuit into a second closed-circuit loop having direct current flowing in one direction therein, said last-mentioned current causing said current in said first closed-circuit to change its directional flow from said one direction to a direction reversed therefrom;

means connected to said second loop for detecting said current flowing therein to provide a second control voltage;

means connected to a distant end of said third line and activated by said second control voltage to apply said second synchronizing signal to said last-mentioned line;

and means connected in said first loop at said first line one end for detecting said reversed direction current to provide a third control voltage which activates said blocking means to pass therethrough said selected second synchronizing signal from said filter means to said first synchronizing signal applying means for synchronizing said first synchronizing signal applying means at said calling station with said second synchronizing signal applying means at said called station and at the same time for terminating the application of said first synchronizing signal to said second line.

5. The video telephone set system according to claim 1 in which:

said first synchronizing signal current means comprises:

means activated by said first control voltage to generate and apply said first synchronizing signal current to said one end of said second line;

and filter means activated by said first control voltage to select said second synchronizing signal from said third line;

and said blocking means includes switch means connected in circuit between said filter means and said signal generating means and normally inactivated in an open-circuit state to prevent the transmission of said selected second synchronizing signal current therethrough from said filter means to said signal generating means; said switch means activated by said third control voltage to a closed-circuit state to transmit therethrough said selected second synchronizing signal current from said filter means to said signal generating means.

References Cited

UNITED STATES PATENTS

| | | | |
|---|---|---|---|
| 3,352,966 | 11/1967 | Sawazaki | 178—6 |
| 2,895,005 | 7/1959 | Kock | 178—6 |

KATHLEEN H. CLAFFY, Primary Examiner

T. J. D'AMICO, Assistant Examiner